United States Patent [19]
Boyesen et al.

[11] Patent Number: 5,373,867
[45] Date of Patent: Dec. 20, 1994

[54] REED VALVE MECHANISM

[75] Inventors: Eyvind Boyesen, R.D. #2, Box 246A, Kempton, Pa. 19529; Robert E. Rarick, II, Bowers, Pa.

[73] Assignee: Eyvind Boyesen, Kempton, Pa.

[21] Appl. No.: 127,894

[22] Filed: Sep. 28, 1993

[51] Int. Cl.⁵ ............... F16K 15/16; F16K 31/00
[52] U.S. Cl. ................ 137/514; 137/512.15; 137/855; 137/904; 251/64; 123/73 V
[58] Field of Search ........... 137/512.15, 514, 855, 137/904; 251/64; 123/73 V

[56] References Cited

U.S. PATENT DOCUMENTS

| | | | |
|---|---|---|---|
| 2,578,590 | 12/1951 | Perrault | 137/514 X |
| 2,717,001 | 9/1955 | Perrault | 137/514 |
| 3,286,728 | 11/1966 | Stephenson | 137/856 |
| 4,082,295 | 4/1978 | Bainard | 123/73 V X |
| 4,083,184 | 4/1978 | Ushijima | 137/856 X |
| 4,089,348 | 5/1978 | Yoshida | 137/856 |
| 4,257,458 | 3/1981 | Kondo et al. | 137/855 |
| 4,531,541 | 7/1985 | Hartshorn | 137/514 |
| 4,633,825 | 1/1987 | Flaig | 123/73 V |
| 5,247,912 | 9/1993 | Boyesen et al. | 123/73 V X |

*Primary Examiner*—John Rivell
*Attorney, Agent, or Firm*—John W. Logan, Jr.

[57] ABSTRACT

An improved reed valve mechanism having a cushioned reed valve seat is disclosed. The present invention provides a smooth resilient insert which is attached around ports in a reed cage and projects beyond the reed cage surface on which the reed valve members seat. The benefits of conventional rubber coated reed cages are supplied without the expenses inherent in previous construction methods. Various mechanical mounting means are disclosed for ease in construction and improved reed valve performance.

13 Claims, 3 Drawing Sheets

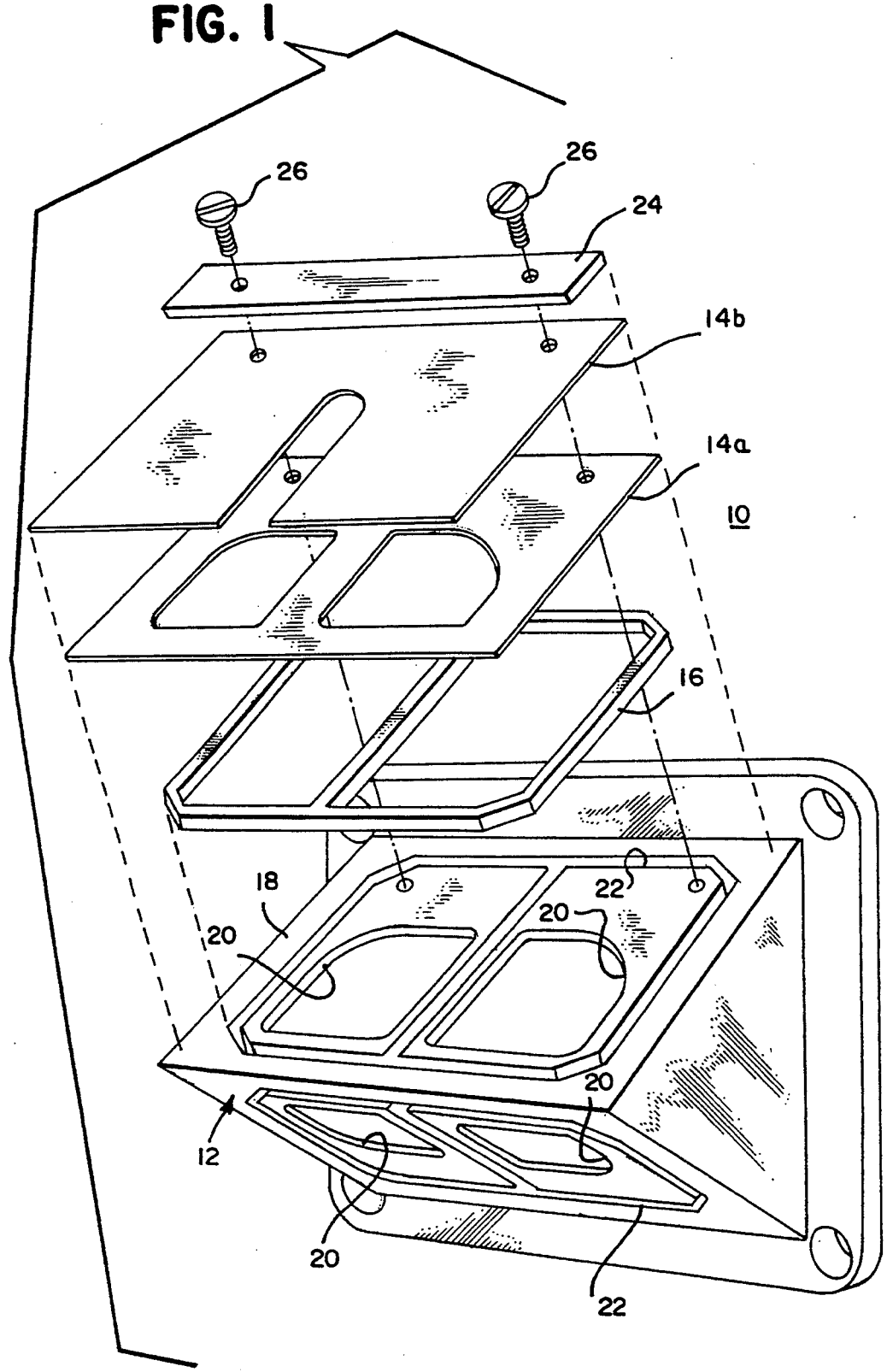

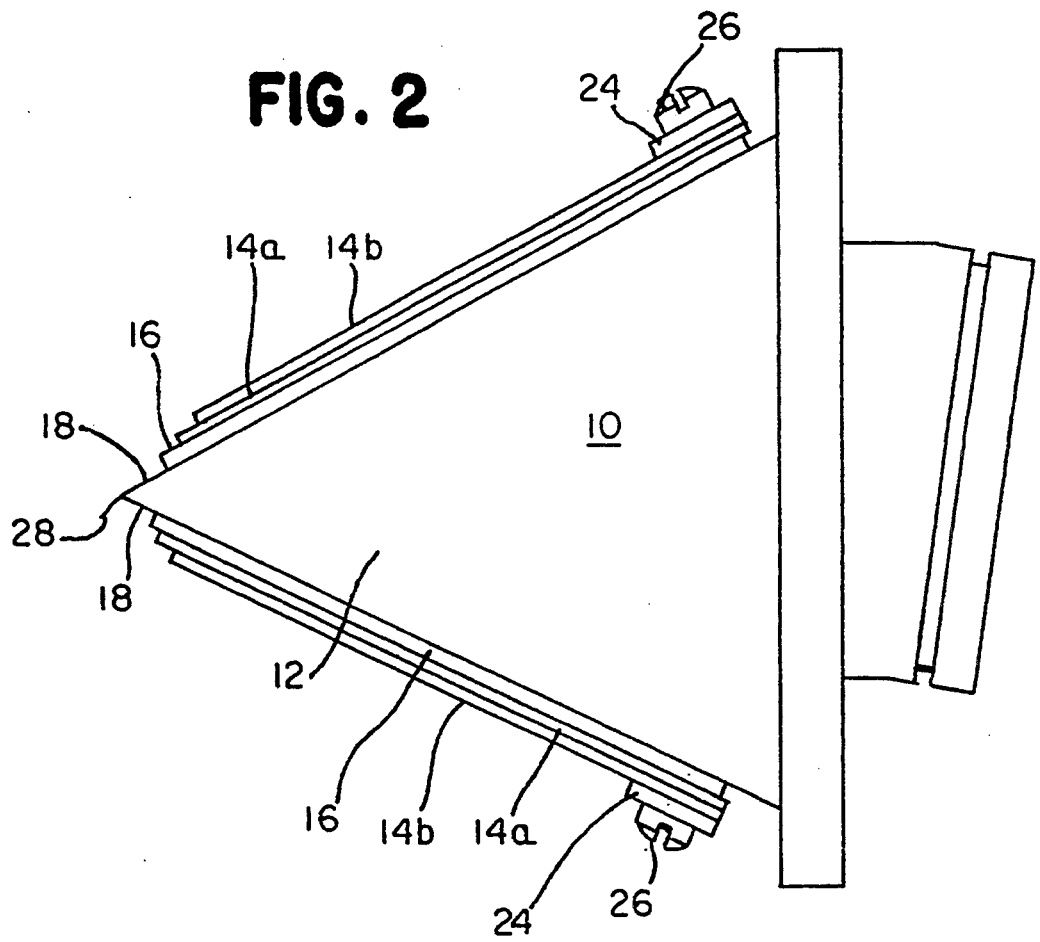
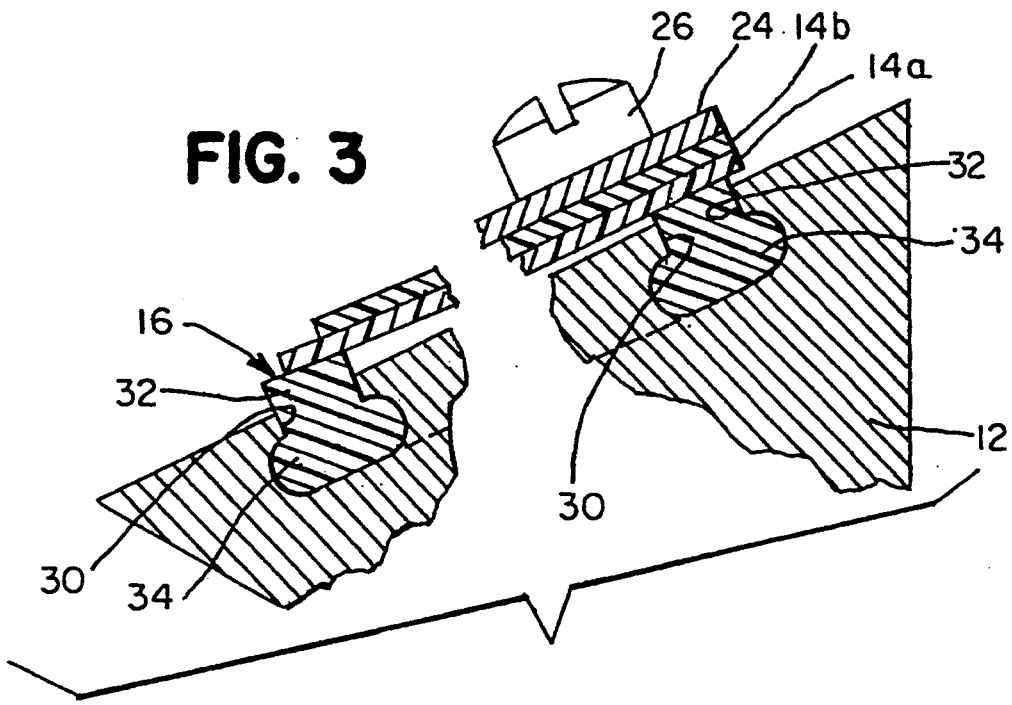

REED VALVE MECHANISM

BACKGROUND OF THE INVENTION

1. Field of the Invention

The present invention is directed to reed valve mechanisms for use in controlling fluid intake into and/or through fluid passages in internal combustion engines and in other fluid passages. More particularly, the present invention provides improved apparatus and method for constructing such reed mechanisms.

2. Background of the Prior Art

Presently it is common to employ various valve mechanisms to control air or air and fuel intake into and through internal combustion engines. The most widespread use of such valves today is a flexible "reed valve" which covers a port in a reed cage. The reed valve is attached at one of its ends to a base of the reed cage, allowing its unattached opposite end covering the port to be lifted away from the port. By orienting the reed cage in a downstream direction in the engine's air intake passage, when a negative pressure is present in the engine, the reed valve is flexed away from the reed cage port ant fluid is permitted to be drawn into the engine; when draw from the engine ceases, the reed valve shuts upon the port and fluid flow ceases.

The use of such reed valves is now standard on most crankcase compression two-stroke cycle engines both to control fluid intake and fluid transfer from the crankcase to the combustion chamber. Examples of such mechanisms are disclosed in applicant's U.S. Pat. Nos. 3,905,340, 3,905,341 and 4,051,820. More recently, similar reed valves have been utilized to improve engine performance in a variety of other applications, including in four-stroke cycle engines.

With the widespread use of reed valves, including metal and fiber composites, there has been considerable interest in finding ways to improve reed valve life and performance. One technique to improve reed valve life is to coat the reed cage with an elastomer, such as rubber or plastic, to provide a cushioned seat for the reed valve to strike on each cycle of the engine. In internal combustion engines, the use of such a cushioned seat is considered crucial to achieve adequate reed valve life from most conventional reed valves.

The conventional process for creating a cushioned reed valve seat is time consuming and expensive. Currently reed cage manufacturers must first arrange to have a recess provided in the reed cage surrounding each port in the reed cage. This is accomplished either by casting the reed cages with the recess or by machining the recess into the cage once the cage has been constructed. Once the recess is provided, the reed cage is then subjected to a complex coating process.

To coat the reed cage with rubber, generally two dies are furnished, one adapted to surround the outside of the recessed portion of the reed cage and the other inserted on the inside of the reed cage to prevent rubber from leaking into the interior of the reed cage. These dies must be carefully proportioned to assure exact fit and minimal leakage during rubber casting. Once the dies are in place, liquid rubber is injected under pressure into openings in the dies to fill the recessed portion of the reed cage.

After the rubber coating is applied, the rubber coating must then be planed or machined down to provide a smooth valve seat surrounding each port. If machining is not performed exactly or if too little rubber has been provided (e.g. as the result of air pockets), an uneven surface may be created which will lessen engine performance and may cause premature wear and deterioration of the reed valves.

Another come-on problem emerges if the dies do not exactly fit the reed cage. In these instances, the rubber will spread well beyond the recessed portion of the reed cage and require additional machining work for preparation of the valve cage. Evidence of such rubber leakage is commonalty seen on production reed cage units.

The entire procedure is extremely exacting and very expensive, costing on the order of approximately $14.00 per valve for low volume production and no less than approximately $3.00 per valve for very high volume production. These costs severely restrict the use of rubber coated valve seats to only higher cost applications, making it unrealistic to coat inexpensive reed cages such as reed plates in air compressors.

The molding process itself also tends to limit the type of valves which may be rubber coated. Reed cage designs which do not readily permit the insertion of a die or machining equipment into the interior of the reed cage, such as the aeroform reed cage disclosed in applicant's U.S. Pat. No. 4,879,976, cannot be rubber coated using this process without employing even more precise dies. Although it is possible to rubber coat these units by using a die which only mounts on the outside of the cage and includes projections which exactly fit within each port in the reed cage to prevent leakage into the interior of the reed cage, this process has design tolerances which are so demanding that full production quantities are not practicable.

In response to the restrictions and high costs of this procedure, a number of other solutions have been implemented. In U.S. Pat. No. 4,696,263, applicant disclosed that the reed valves themselves may be rubber coated to improve life and performance. It has been found that reed valves constructed using this technique will perform as well or better against an uncushioned reed cage as conventional reed valves will perform against a rubber coated reed cage. However, if these rubber coated valves are combined with a properly constructed rubber coated reed cage, exceptional reed valve life can be expected.

Other procedures which have been implemented to avoid premature reed valve failure include techniques for improving flow through the reed cage itself, such as is disclosed in applicant's U.S. Pat. No. 4,879,976, and various modifications to basic reed valve design to limit stresses on the reed petals, such as is disclosed in applicant's U.S. Pat. No. 5,036,806. Despite the successes with these strategies, a cushioned reed cage remains highly desirable for maximum reed valve life.

Various attempts to create a less expensive cushioned reed cage also have been explored over the years. A number of patents have apparently described applying an independent layer of elastomer directly to a reed cage in order to cushion the reed valve. In U.S. Pat. No. 3,286,728 to Stephenson, issued Nov. 22, 1966, it is suggested to apply a layer of elastomer alone to a single face of a reed cage in order to create a cushioned reed valve seat. The precise method of attachment of the elastomer is not addressed in this patent. U.S. Pat. No. 4,633,825 to Flaig, issued Jan. 6, 1987, similarly teaches that a single layer of elastomer alone may be applied to each face of a non-recessed reed cage to provide a cushioned reed seat. A grommet is employed no assist in holding the elastomer layer in place on the distal end and the reed valve mounting hardware is used to hold the reed valve members and the elastomer in place on the base end.

In a somewhat different application, U.S. Pat. No. 4,082,295 to Bainard, issued Apr. 4, 1978, shows use of a reed valve to control fluid flow between crankcase chambers of a multiple cylinder two-stroke cycle engine and an elastomer seal attached to the reed valve seat to seal against the crankshaft. In that patent it is suggested to employ a rubber coating on a metal substrate as a non-recessed reed valve seat, with a mounting bolt passing through a reed valve and the reed valve seat to hold the entire unit together. Although it is not shown, that patent also suggests employing a similar non-recessed, rubber coated metal reed valve seat in other reed valve construction, such as that shown in the Stephenson patent.

Although the apparatus disclosed in the above patents may function adequately, further significant improvements are believed possible in reed cage construction. First, although a number of the above patents suggest avoiding a recessed reed cage, a recessed reed cage is believed to be important for proper reed valve performance. Second, none of the above patents is believed to provide a fully adequate method of mounting a separate elastomer layer to the reed cage. Among the probable problems are: the fragile nature of a non-reinforced elastomer layer; and insufficient and/or overly complicated methods of mounting the elastomer layer.

Accordingly, it is a primary object of the present invention to provide a method of construction of a reed valve mechanism for use in an internal combustion engine which supplies a cushioned reed valve seat at minimal manufacturing cost and effort.

It is a further object of the present invention to provide such a reed valve mechanism with a smooth and even valve seat without the need for machining of the cushioned surface.

It is an additional object of the present invention to provide such a reed valve mechanism which optimizes reed valve life and performance by reducing stresses on the reed valve members while assuring proper reed valve operation.

It is another object of the present invention to provide such a reed valve mechanism which is easily and efficiently constructed, with minimal expense and complication.

It is yet another object of the present invention to provide such a reed valve mechanism which may be easily implemented with other advances in reed valve technology to deliver even greater performance and reed valve life.

A still further object of the present invention is to provide a cushioning member for reed valves which may taper uniformly upward from the base of the valve cage to the apex thereof to allow more uniform seating of the reed valves.

These and other objects of the present invention will become evident from review of the following specification.

SUMMARY OF THE INVENTION

The present invention provides an improved apparatus and method of construction of reed valve mechanisms having a cushioned valve seat.

In the preferred form, the valve mechanism of the present invention comprises a ported reed cage, reed valves adapted to seal against the reed cage, and a separate cushioned insert adapted to be secured within a recess surrounding the reed cage port to serve as a reed valve seat: which extends slightly above the reed cage side walls. The insert is preferably formed of a resilient synthetic rubber or similar material. Preferably, the insert is secured to the reed cage in a manner which provides a solid yielding base to which to attach reed valve members. The insert may be secured within a groove in the valve seat and further attached with an adhesive. Additionally, the mounting means and valve cage base may be further modified to provide even better reed valve performance and life.

By forming the insert from a preformed or cast resilient material, a completely smooth and uniform surface may be easily provided. With one or more of the various mechanical mounting means disclosed, inserts may be applied to the reed cage extremely rapidly and inexpensively. In this manner, cushioned reed cages can be manufactured with very smooth and even valve seats, but without the need for tedious and expensive manipulation of the reed cage unit itself to apply a rubber coating.

Use of the reed valve mechanism of the present invention provides exceptional reed valve life and performance. Additionally, the present invention lends itself to use with other reed valve advances, such as rubber coated reed valves and improved reed cage designs, to produce superb reed valve performance.

DESCRIPTION OF THE DRAWINGS

The operation of the present invention should become apparent from the following description when considered in conjunction with the accompanying drawings, in which:

FIG. 1 is a three-quarter isometric view of one embodiment of a valve mechanism of the present invention, with the insert, a reinforcement plate and conventional dual stage reed valves all shown in exploded orientation from a reed valve cage.

FIG. 2 is a side elevational view of a reed valve cage and reed valve assembly made in accordance with the present invention.

FIG. 3 is an enlarged sectional view showing a preferred form of mounting the resilient insert members.

DETAILED DESCRIPTION OF THE INVENTION

Figure 4A:
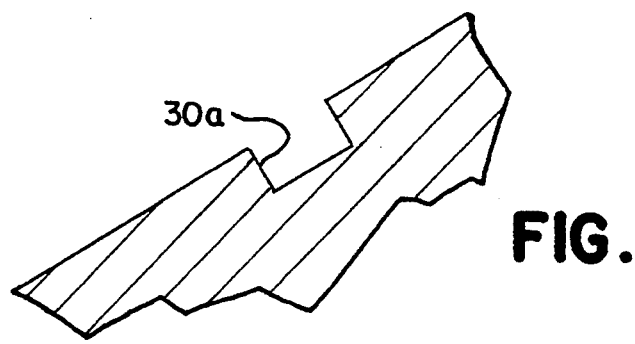
FIGS. 4a, 4b and 4c are fragmentary sectional views illustrating various groove forms in the reed valve cage for mounting the resilient insert.

The present invention provides a reed valve mechanism 10 for use to control fluid flow through a fluid passage. Although the present invention is primarily directed at reed valve mechanisms used to control fluid intake and/or fluid transfer in an internal combustion engine, the present invention may also be employed in a variety of other fluid control applications, such as to control fluid flow through an air compressor or similar device.

As is shown in FIG. 1, the reed valve mechanism of the present invention comprises a valve cage 12, reed valve member or members 14a, 14b, and a reed cage insert 16. The reed cage 12 includes one or more side walls 18 and one or more ports 20 in each of the side walls 18. The reed valve members 14a, 14b mount to the reed cage 12, sealing each port 20 when the valve members 14a, 14b are in a closed position against a valve seat 22 surrounding the periphery of each port 20. The valve members 14a, 14b may be retained to the reed cage 12 in any known manner, including through use of a base plate 24 and one or more bolts 26. It should be understood that the term "base plate" as used herein is meant to encompass any form of device mounted over the base of reed valve members to hold them in place, including the plate illustrated and the use of reed stops to accomplish this function.

As has been explained, it is common in present internal combustion engine reed cage designs to include cushioning on the valve seat 22 surrounding each port 20. In the present invention, the cushioning means is a cast or otherwise formed insert 16 of a resilient material. Such resilient materials may include natural or synthetic rubber such as buna-N rubber, urethane rubber, silicone rubber, neoprene rubber, and fluoroelastomers (e.g. materials available under the tradename VITON ®).

In a reed cage having a V-shaped apex 28 to be positioned in a downstream direction in an engine intake, it is common for each side wall 18 of the reed cage to have port or ports formed therein. For such an application, individual inserts 16 may be positioned on each side wall surrounding the ports 20 in each of the side walls 18.

Figure 5A:
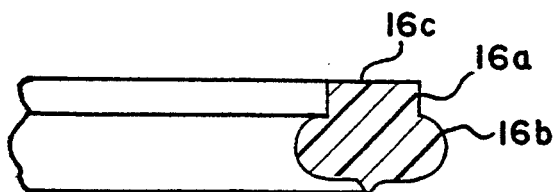
FIGS. 5a and 5b are cross sectional views of preferred forms of the resilient insert member.
Figure 5B:

FIG. 3 illustrates a preferred embodiment of insert of the present invention. In accordance with the invention, a groove 30 is formed in each side surface 18 of the reed cage closely surrounding each port 20 into which the insert 16 is secured. In the embodiment shown, the groove 30 has a narrow entrance 32 and an enlarged base portion 34. When an insert 16a, such as shown in FIG. 5b is inserted into the groove 30, it completely fills the enlarged base and is securely Locked in place. However, it is preferable to apply a suitable adhesive to the groove 30 prior to placing the insert in the groove to insure a permanent mounting of the insert. As illustrated, the insert 16a has an enlarged base portion 16b and a narrow upper portion 16c which projects beyond the outer surface of the groove. Also, the upper portion of the insert 16a increases uniformly in height from the base of the reed cage toward the apex thereof. It has been found that a projection of the insert of approximately 0.005 inches beyond the surface 18 at the base of the reed cage which increases to approximately 0.010 inches at the apex provides an ideal seating surface for the reed valve members. Alternatively, a uniform projection of the insert beyond the surface 18 is also satisfactory.

Figure 4B:
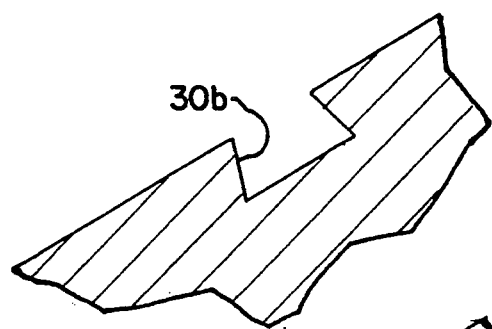
Figure 4C:
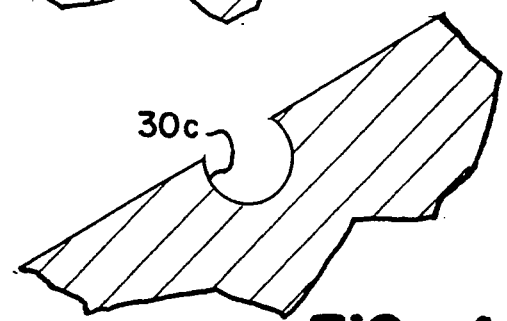

Other forms of grooves usable in the present invention are shown in FIGS. 4a, 4b and 4c. In FIG. 4a, a rectangular groove 32a is provided adapted to receive an insert 16 of rectangular cross sectional shape as shown in FIGS. 1 and 5a. The groove 30b of FIG. 4b has a trapezoidal cross section increasing in width toward its base. The insert for this groove can either be shaped to conform to the shape of the groove or be similar to that shown in FIG. 5b. Another form of groove 16c is shown in FIG. 5c in the form of three-quarters of a circle with a narrow entrance and rounded side and bottom walls. The insert 16a of FIG. 5b may be used with this groove, 5c. In each of the above, an adhesive should be used to secure the insert in place. It should also be apparent that other shapes of grooves and inserts may be used in the present invention.

As should be evident, the present invention may be quite useful in virtually any application where reed valve-type valve mechanisms are employed. In light of such varied applications, the use of the term "reed cage" in the present application is intended to include any device or mechanism used to anchor a reed valve-type member, whether the side wall is mounted parallel with, perpendicular to, or at an angle to the flow of fluid through the reed mechanism.

With respect to internal combustion engines, it should be understood that the present invention may be used with all forms of reed valves, including single and multiple stage reed valves, to control fluid intake of air or air and fuel in all forms of internal combustion engines, whether carbureted or fuel injected. Additionally, the present invention may be used with equal success in both two-stroke cycle and four-stroke cycle engines. Accordingly, the use of the terms "fluid intake" and "fluid flow" are intended to be broadly construed to include air or air/fuel intake and fluid transfer to a combustion chamber in a crankcase compression engine, as well as all forms of fluid transfer in compressors and similar devices.

Although particular embodiments of the present invention are disclosed herein, it is not intended to limit the invention to such a disclosure and changes and modifications may be incorporated and embodied within the scope of the following claims.

What is claimed is:

1. A reed valve mechanism to control flow through a fluid passage, which mechanism comprises:
   a reed cage having at least one side wall and at least one port in the side wall to a flow passage of fluid through the reed valve mechanism;
   a reed valve member attached to the reed cage to control flow of fluid through the port by alternating between open and closed positions;
   a groove in said side wall surrounding said port; and
   a resilient insert member secured within said groove and surrounding said port;
   said insert extending from said groove beyond said side wall to provide a cushioned surface engaged by said reed valve member in the closed position thereof;
   said side wall having a base at one end thereof and an apex at the other end thereof, said port having one edge thereof spaced from the apex and side edges extending toward said base; and said groove closely surrounding said port at the apex and side edges and spaced apart from said port at the base.

2. The reed valve mechanism of claim 1 wherein said reed valve member is secured to the reed cage side wall at the base thereof overlying said groove and extends toward the apex of said side wall.

3. The reed valve mechanism of claim 1 wherein interlocking means are provided to lock said insert into said groove.

4. The reed valve mechanism of claim 3 including an adhesive securing said insert into said groove.

5. The reed valve mechanism of claim 2 wherein said groove has a narrow opening at the surface of said side wall and an enlarged recessed portion of greater extent than that of the narrow opening.

6. The reed valve mechanism of claim 2 wherein the insert projects outwardly from said groove beyond the surface of said side wall, said outward projection being less at the base of said side wall than at the apex.

7. The reed valve mechanism of claim 6 wherein said outward projection of the insert from the surface of the side wall increases uniformly from the base to the apex.

8. The reed valve mechanism of claim 7 wherein said insert has a neck portion of uniform cross-sectional thickness projecting out of said groove and a base portion having a cross-sectional thickness greater than that of said neck portion.

9. The reed valve mechanism of claim 6 wherein the cushioned surface of said insert is planar.

10. The reed valve mechanism of claim 2 wherein the reed cage includes a base plate on the side wall at the base thereof which assists in retaining the reed valve member to the reed cage, said base plate overlying the groove at the base of said surface.

11. The reed valve mechanism of claim 2 wherein said insert is formed of a resilient material selected from the group consisting of buna-N rubber, urethane rubber, silicone rubber, neoprene rubber and fluoroelastomers.

12. A reed valve mechanism to control flow through a fluid passage, which mechanism comprises:
   a reed cage having at least one side wall and at least one port in the side wall to allow passage of fluid through the reed valve mechanism;
   a reed valve member attached to the reed cage to control flow of fluid through the port by alternating between open and closed positions;
   a groove in said side wall surrounding said port;
   a resilient insert member secured within said groove and surrounding said port;
   said insert extending from said groove beyond said side wall to provide a cushioned surface engaged by said reed valve member in the closed position thereof;
   said side wall having a base at one end thereof and an apex at the other end thereof, said port having one edge thereof spaced from the apex and side edges extending toward said base;
   mounting means to mount the reed valve member to the reed cage adjacent the base of the reed cage;
   said mounting means including at least one fastener extending through the reed valve into the reed cage, and said groove having a portion thereof at the apex and a portion thereof at the base of said side wall; and
   said groove closely surrounding the port and the mounting means.

13. A reed valve in accordance with claim 12 including at least two adjacent ports in said reed cage, said reed valve member overlying said ports, and said groove having a portion thereof extending between adjacent ports from that portion of the groove adjacent the apex of the reed valve cage to that portion of the groove surrounding the mounting means.

* * * * *

UNITED STATES PATENT AND TRADEMARK OFFICE
CERTIFICATE OF CORRECTION

PATENT NO. : 5,373,867
DATED : December 20, 1994
INVENTOR(S) : Eyvind Boyesen et al.

It is certified that error appears in the above-identified patent and that said Letters Patent is hereby corrected as shown below:

Col. 2, line 5  -  "come-on" should be --common--

Col. 2, line 32 -  delete the colon after "not"

Col. 4, line 4  -  delete the colon after "seat"

Col. 5, line 36 -  "Locked" should be --locked--

Col. 6, line 33 -  "a flow" should be --allow--

Signed and Sealed this

Twenty-first Day of February, 1995

Attest:

BRUCE LEHMAN

Attesting Officer         Commissioner of Patents and Trademarks